United States Patent [19]
Meise et al.

[11] 3,750,038
[45] July 31, 1973

[54] AMPLIFIER CIRCUIT FOR COINCIDENTALLY PROVIDING SIGNAL CLAMPING OPERATION

[75] Inventors: William H. Meise, Southampton, Pa.; Henry B. Marron, Moorestown, N.J.

[73] Assignee: Jerrold Electronics Corporation, Philadelphia, Pa.

[22] Filed: Nov. 12, 1971

[21] Appl. No.: 198,351

[52] U.S. Cl. .................... 330/11, 330/29, 330/30 D
[51] Int. Cl. .......................................... H03f 21/00
[58] Field of Search ....................... 330/9, 11, 30 D, 330/69, 29; 178/7.5 DC, 7.3 DC, DIG. 26

[56] References Cited

UNITED STATES PATENTS

| | | | |
|---|---|---|---|
| 3,598,912 | 8/1971 | Nillesen | 178/7.5 DC X |
| 3,557,305 | 1/1971 | Dann | 178/7.3 DC |
| 2,929,998 | 3/1960 | Diehl | 330/22 |
| 2,572,179 | 10/1951 | Moore | 178/7.3 DC |

FOREIGN PATENTS OR APPLICATIONS

| | | | |
|---|---|---|---|
| 923,173 | 4/1963 | Great Britain | 330/11 |
| 920,053 | 3/1963 | Great Britain | 330/11 |

*Primary Examiner*—John Kominski
*Assistant Examiner*—James B. Mullins
*Attorney*—Nichol M. Sandoe et al.

[57] ABSTRACT

A video amplifier for coincidentally clamping synchronizing pulse peaks (tips) to a reference potential to effect direct current restoration employs a difference amplifier with alternating and direct current feedback network paths. The d.c. feedback structure includes a periodically enabled diode-capacitor network for establishing the circuit clamping potential, while the difference amplifier and the operatively distinct a.c. feedback circuitry function in an operational amplifier mode to amplify the video intelligence.

7 Claims, 4 Drawing Figures

Figure 1:
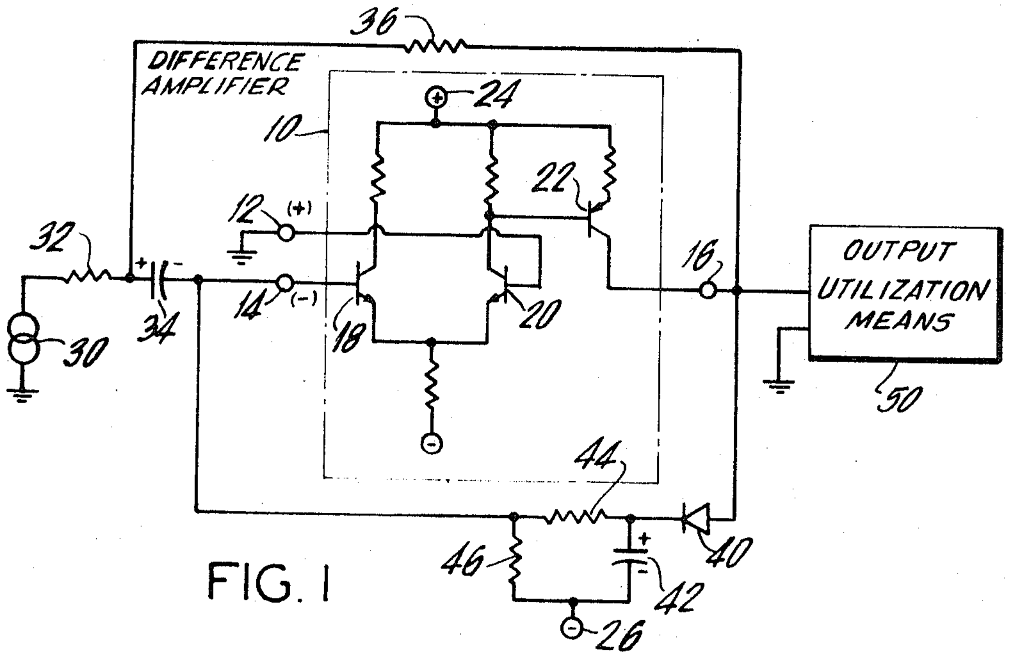

INVENTORS
WILLIAM H. MEISE
HENRY B. MARRON
BY
Sandoe, Hopgood & Calimafde
ATTORNEYS

AMPLIFIER CIRCUIT FOR COINCIDENTALLY PROVIDING SIGNAL CLAMPING OPERATION

DISCLOSURE OF INVENTION

This invention relates to electronic signal processing circuits and, more specifically, to an amplifier circuit which coincidentally effects signal clamping or d.c. restoration.

In a video system, the video signal contains time varying picture or video information, and control information such as synchronizing pulses and color burst signals, the composite wave exhibiting a d.c. level. The d.c. signal control level must be maintained in order to properly characterize the video information applied to a modulator in a signal transmission context, or applied to the control element of a display unit in a signal receiving and display application.

One method for maintaining the direct-current control level is to use direct current coupling through the video signal amplifying and signal processing circuitry. This is, however, both impractical and economically prohibitive in commercial video systems. Accordingly, the art typically employs alternating current coupling for the video signal, followed by direct-current restoration at or near the terminal point of video wave propagation. To this end, one widely employed direct-current restoration technique is to clamp the extremity (tips) of the synchronizing pulses to a direct current reference potential during the synchronizing pulse interval, this being done, for example, by a suitably controlled gated feedback network.

However, prior art video signal clamping and amplifying circuitry has been relatively complex. Moreover, those circuits performing both amplification and direct current restoration, beyond their complexity, have exhibited an undesirable interdependence between their clamping and amplification offices.

It is thus an object of the present invention to provide an improved circuit arrangement for coincidentally amplifying a video wave, and for restoring a direct current level to the amplified wave.

It is another object of the present invention to provide a video clamp-amplifier circuit which is relatively simple in design, and which may be readily and inexpensively constructed.

The above and other objects of the present invention are realized in a specific, illustrative combined clamp and amplifier circuit which includes a difference amplifier with distinct d.c. and a.c. feedback networks. A diode in the d.c. feedback path passes current during the video synchronizing peak intervals to maintain the charge in an amplifier biasing capacitor. The d.c. feedback structure operates to clamp the amplified replica of the maximum excursions of the incident video signal (the synchronizing pulse tips) to a predetermined potential.

The video signal between synchronizing intervals causes the amplifier to reverse bias the diode, with the composite circuitry functioning in an operational amplifier mode for the then incident video information.

Figures 2A, 2B:
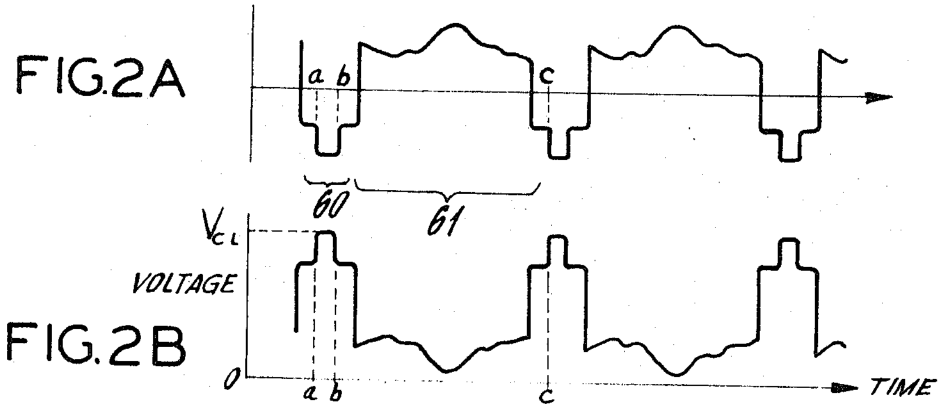
Figure 3:
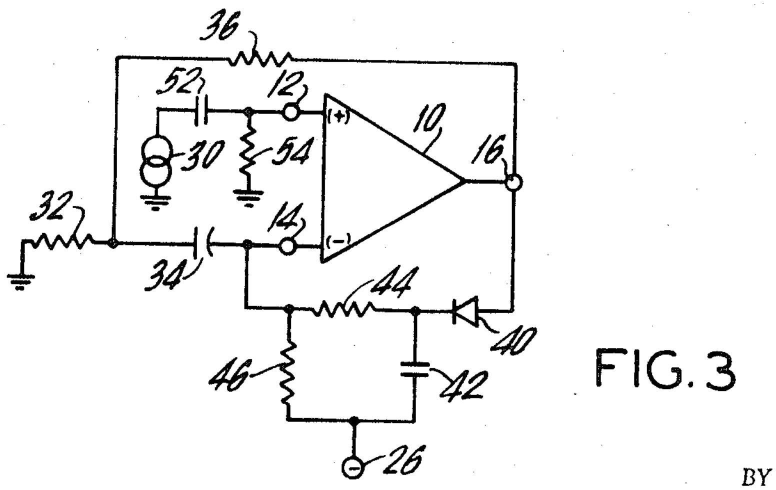

These and other features and advantages of the present invention will become readily apparent upon consideration of a specific illustrative embodiment thereof, presented in detail hereinbelow in conjunction with the accompanying drawing, in which:

FIG. 1 schematically illustrates a combined clamp and amplifier circuit arrangement embodying the principles of the present invention;

FIGS. 2A and 2B are waveforms characterizing the potential obtaining a selected circuit nodes of the FIG. 1 arrangement; and FIG. 3 is an alternative combined clamp and amplifier embodiment of the present invention.

Referring now to FIG. 1, there is shown a specific, illustrative combined video clamp-amplifier circuit for simultaneously amplifying (inverting mode) a video signal supplied by a source 30 thereof, and for clamping the amplified and inverted signal to a reference potential. The video signal source 30 may illustratively comprise preceding alternating current coupled amplifier stages. A typical alternating coupled video wave, therefore having a zero d.c. or average level, is shown in FIG. 2A, and comprises a repetitive sequence of synchronizing pulse intervals 60 followed by a video intelligence signal periods 61, as well known to those skilled in the video art.

The clamp-amplifier circuit comprises a difference amplifier 10 having noninverting and inverting input terminals 12 and 13 and an output terminal 16. The difference amplifier 10 may comprise any relatively high gain amplifier structure such that signals of a given polarity applied to the input terminals 12 and 14 will produce at terminal 16 an amplified replica thereof of the same and opposite polarity, respectively. The differential amplifier 10 may comprise, for example, a pair of differentially connected input transistors 18 and 20 having their emitters connected, the collector signal of the difference transistor 20 being coupled to the base of a transistor 22 of the opposite conductivity type.

Alternating and direct current feedback networks are operatively connected between the amplifier output terminal 16 and inverting input terminal 14. Examining first the d.c. feedback structure, a diode 40 selectively passes the amplifier output voltage to a storage capacitor 42 and to a voltage divider network formed of resistors 44 and 46, a junction between the resistor 46 and the capacitor 42 being connected to a negative voltage source 26. The output of the voltage divider 44–46 supplies a quiescent d.c. biasing potential to the amplifier inverting input terminal 14.

The video source 30 is connected by an input resistance 32 and a capacitor 34 to the amplifier inverting input terminal 14, and a feedback resistor 36 connects the amplifier output terminal with the common node of the resistor 32 and the capacitor 34. The resistors 32 and 36, together with the capacitor 34, provide a.c. feedback about the difference amplifier 10.

To illustrate the operation of FIG. 1 clamp (d.c. restoration) -amplifier circuit, assume that the input video signal supplied by the video source 30 has just reached its negative most excursion, i.e., its synchronizing pulse tip, as at a time *a* shown in FIG. 2A. The negative going leading edge of the pulse tip is coupled by the resistor 32 and the capacitor 34 to the inverting amplifier input terminal 14 such that the voltage at the inverting terminal 14 becomes more negative than the zero potential of the rounded noninverting input terminal 12. By conventional operation of the high gain difference amplifier 10, the amplifier output terminal 16 rapidly becomes positive. For the specific difference amplifier circuitry shown in FIG. 1, the negative going potential at terminal 14 causes the transistor 18 to conduct less heavily, thereby lowering the potential at the common emitter junction of the transistors 18 and 20. This, in turn, increases conduction in the difference transistor 20 lowering its collector potential which increases current flow through the transistor 22. Increasing current flow through the unit 22 thus raises the potential at the output terminal 16 having a lead 50 connected thereto.

The rising potential at the amplifier output terminal 16 renders the diode 40 conductive, thereby rapidly storing charge in the capacitor 42 to increase the potential thereacross. The increasing voltage across the capacitor 42 also causes the output voltage of the voltage divider 44–46 to increase. By conventional feedback principles, the output potential at terminal 16 automatically increases to a level such that, under steady state conditions, the d.c. feedback circuitry provides a potential to the inverting input terminal 14 which is substantially equal to the voltage obtaining at the noninverting input terminal 12 (zero volts for the assumed case). The very small difference present between the terminals 12 and 14 is only the voltage required in any feedback system to support the amplifier output potential, and is de minimis for amplifiers 10 of larger gain. For the present instance, the output terminal 16 will rise in potential to the clamping potential of the system, which is that voltage required such that the output of the voltage divider 44–46 is substantially zero volts. In mathematical terms, the reference or clamping potential $V_{cl}$ is expressed by:

$$(V_{cl} + |V_{26}| - 0.7)\ (R_{46})/(R_{44} + R_{46}) - |V_{26}| = V_{10\text{-}12} = 0, \quad \text{Equation (1)}$$

wherein $|V_{26}|$ is the absolute value of the potential supplied by the voltage source 26; $R_{46}$ and $R_{44}$ are the resistance values of the resistors 46 and 44; and $V_{10\text{-}12}$ is the voltage at the amplifier terminal 10. The 0.7 factor accounts for an assumed 0.7 volt conductive drop across the conductive diode 40. Solving Equation (1) for clamping, or reference potential yields:

$$V_{cl} = 0.7 + |V_{26}|\ [\ R_{44}\ ]/R_{46} \quad \text{Eq. (2)}$$

The output of the amplifier 10 at terminal 16 remains fixed at the clamping potential $V_{cl}$ during the synchronizing pulse tip interval *a–b* in FIGS. 2A and 2B, with the diode 40 being conductive until the storage capacitor 42 is fully charged to the difference in potential between the clamping voltage and that of the negative source 26. When the capacitor 42 is so charged shortly following the time *a*, the output of the voltage divider 44–46 supplies the near ground d.c. potential to the amplifier inverting terminal 14 such that the operational amplifier 10 is balanced and stabilized from a d.c. standpoint.

Following the synchronizing pulse tip interval, viz., following the time *b* in FIG. 2A, the input potential supplied by the source 30 increases from its negative most value. This increase is coupled to the amplifier inverting input terminal by the resistor 32 and capacitor 34. The amplifier output potential therefore decreases from its maximum potential at the time *b* in FIG. 2B. Accordingly, since the discharge time constant for the capacitor 42 is made relatively long compared to video line trace interval (and therefore remains charged to present substantially the voltage $V_{cl} - 0.7$ to the cathode of the diode 40 during all further circuit operation), the diode 40 becomes reverse biased following the time *b* and is nonconductive for the remainder of the full horizontal trace interval. For the horizontal trace period, the requisite substantially zero d.c. potential required at the amplifier noniverting input terminal 14 is supplied from the capacitor 42 acting through the voltage divider 44–46.

For the line trace interval between the times *b* and *c* shown in FIGS. 2A and 2B, i.e., between synchronizing pulse tip intervals, the video information supplied by the source 30 undergoes amplification without clamping. This amplification is effected by an operational amplifier mode of operation (inverting mode for the FIG. 1 embodiment), wherein the feedback resistor 36 and the input resistor 32 provide an a.c. virtual ground at their junction point which is coupled by the capacitor 34 as a d.c. virtual ground to the amplifier inverting terminal 14. The capacitor 34 is selected to be sufficiently large such that it cannot substantially change its stored potential over a horizontal line trace period. The time constant for the capacitor 34 is inherently relatively large by reason of the high impedance connected to the right terminal of the capacitor in FIG. 1, viz., the high impedance of the divider network 44–46 and the input of the operational amplifier 10. As a practical matter, the voltage across the capacitor 34 may readily be made substantially constant over several line trace periods.

The inverting mode operational amplifier performance of the composite FIG. 1 circuit in its nonclamped mode of operation during the line trade interval between the times *b* and *c* will be readily appreciated by those skilled in the art. In brief, the constraint of all operational amplifiers is followed, viz., that the output voltage assumes a value which obviates any difference in potential between the inverting and noninverting input terminals other than the so-called "error" potential necessary to support the output voltage. For the amplifier mode of FIG. 1, wherein the noninverting input potential must stay at substantially ground potential, the output voltage necessarily assumes values such that only this "error" level a.c. potential appears at the left terminal of the capacitor 34 in FIG. 1, and is coupled therefrom to the amplifier terminal 14. There will, in the general case, also be a d.c. potential at the junction of the resistors 36 and 32 which is blocked by the capacitor 34. Virtual ground for the instant application therefore refers to a virtual alternating current ground potential.

Thus, for example, as the voltage supplied by the source 30 becomes less negative from its value at the time *b*, the output potential at amplifier terminal 16 becomes less positive than the clamp value obtaining at the time *b* in FIG. 2B. This output changes in an amount such that there is very little change in potential at the left terminal of the capacitor 34. Thus, by merely selecting the resistance of the feedback resistor 36 to exceed the value of the input resistor 32 (together with the equivalent series source impedance of the source 30), the composite amplifier configuration will produce net alternating current voltage gain. In particular, the relationship between the a.c. component of the output voltage $v_{out}$ as a function of the input voltage $v_{in}$ supplied by the source 30 is given by:

$$\dot{v}_{out} = (R_{36}/R_{32})\ \dot{v}_{in}\ ,$$

Eq. (3)

the negative sign signifying inversion.

Finally, during the synchronizing pulse tip interval *c–d* of the next following line trace interval, the input potential again becomes sufficiently negative such that the diode 40 will conduct to make up the charge lost by the capacitor 42 during the previous line interval.

The FIG. 1 circuit continuously operates in the manner described above to clamp the output wave to a clamping potential during the synchronizing pulse tip intervals, and to amplify the signal portions between such times.

It is observed at this point that the clamp potential and the a.c. video gain, substantially determined by distinct circuit elements, may be readily and independently selected or adjusted. More specifically, the clamping potential may be selected by varying the potential of the source 26; the fixed potential applied to the terminal 12; or the voltage division factor of the resistors 44 or 46, while video signal amplification may be varied by changing the resistor ratio $R_{36} / R_{32}$.

The FIG. 1 arrangement described in detail above has effected inverting mode amplification and has employed negative going synchronizing pulse tips which are inverted and clamped at the positive most potential of the outgoing wave. FIG. 3 depicts a second embodiment of the present invention, substantially similar to that of FIG. 1, wherein the operational amplifier is operated in a noninverting mode, i.e., where positive going synchronizing pulse tips supplied by the source 30 are clamping to a positive reference clamping potential. In the FIG. 3 embodiment, the input signal is coupled to the noninverted amplifier input 12 via an a.c. coupling network 52–54, with one end of the resistor 54 being tied to a fixed potential, e.g., ground. The gain factor for the FIG. 3 embodiment is greater than that for FIG. 2, as is typical for noninverting mode operational amplifiers, the relationship between the input and output a.c. signal components being $$\dot{v}_{out} = (R_{36} + R_{32}/R_{32})\ \dot{v}_{in}\ .$$

Eq. (4)

The arrangement of FIG. 1 may be employed, if desired, to clamp positive going synchronizing pulse tips to a negative potential by simply reversing the diode 40 and the polarity of the source 26. Similarly, it is noted that the FIG. 3 arrangement may be employed to clamp negative going pulse tips to a negative clamp voltage by reversing the diode 40 and the polarity of the voltage supplied by the source 26.

The above described arrangements are merely illustrative of the principles of the present invention. Numerous modifications and adaptions thereof will be readily apparent to those skilled in the art without departing from the spirit and scope of the present invention.

What is claimed is:

1. In combination in a signal translating circuit, a direct current difference amplifier including inverting and noninverting input terminals and an output terminal, first feedback means including a series connected diode and capacitor connected to said amplifier output terminal, first connecting means for connecting said amplifier inverting input terminal and said capacitor, two series connected impedances connected to said amplifier output terminal, and additional capacitor means connecting said amplifier inverting input terminal and the junction point between said series connected impedances.

2. A combination as in claim 1, wherein said first connecting means comprises voltage divider means.

3. A combination as in claim 2, further comprising a voltage source connected to said capacitor.

4. A combination as in claim 1, further comprising a source of video signals connected to said series connected impedances.

5. A combination as in claim 1, further comprising means for impressing a fixed potential at said noninverting input terminal of said amplifier.

6. A combination as in claim 1, wherein said amplifier comprises two differentially connected transistors of a first conductivity type, and a transistor of the opposite conductivity type directly coupled to one of said differentially connected transistors.

7. In combination in a combined video amplifier and clamp circuit, a direct current differential amplifier having inverting and noninverting input terminals and an output terminal, means for supplying a direct current potential to said noninverting input terminal, peak detecting means connecting said amplifier output and inverting input terminals, said peak detecting means comprising a diode conductive during the synchronizing pulse tip intervals of the applied video wave and a storage capacitor, amplification determining, series connected feedback and input resistors, and a direct current blocking capacitor connecting said amplifier inverting input terminal and the junction of said feedback and input resistors.

* * * * *